US006604719B1

(12) United States Patent
Dicke et al.

(10) Patent No.: US 6,604,719 B1
(45) Date of Patent: Aug. 12, 2003

(54) SIGN STAND FOR MOUNTING FLEXIBLE SIGN PANELS

(75) Inventors: Grant D. Dicke, Downers Grove, IL (US); James G. Kokenes, Westmont, IL (US); Jeffrey A. Williams, Downers Grove, IL (US)

(73) Assignee: Dicke Tool Company, Downers Grove, IL (US)

( * ) Notice: Subject to any disclaimer, the term of this patent is extended or adjusted under 35 U.S.C. 154(b) by 0 days.

(21) Appl. No.: 10/099,740

(22) Filed: Mar. 15, 2002

(51) Int. Cl.[7] .............................................. F16M 13/00
(52) U.S. Cl. ..................... 248/160; 248/212.13; 40/606
(58) Field of Search ............................ 248/160, 162.1, 248/158, 284.1, 292.13, 900; 40/606, 612, 608, 610

(56) References Cited

U.S. PATENT DOCUMENTS

| | | | | |
|---|---|---|---|---|
| 245,665 A | | 8/1881 | Scott | |
| 1,432,604 A | | 10/1922 | Lang | |
| 2,085,161 A | | 6/1937 | Kraus | |
| 2,160,676 A | | 5/1939 | Richard | |
| 2,254,566 A | | 9/1941 | Cornell, Jr. | |
| 2,646,950 A | | 7/1953 | Nelson et al. | |
| 3,662,482 A | * | 5/1972 | Sarkisian | 40/602 |
| 4,033,536 A | | 7/1977 | Hillstrom | |
| 4,548,379 A | | 10/1985 | Seely et al. | |
| 4,569,499 A | | 2/1986 | Seely | |
| 4,865,288 A | * | 9/1989 | Dicke et al. | 248/160 |
| 5,442,871 A | * | 8/1995 | Sarkisian et al. | 40/606 |
| 5,725,186 A | | 3/1998 | Hillstrom et al. | |
| 5,829,178 A | * | 11/1998 | Hillstrom | 248/170 |
| 5,878,519 A | | 3/1999 | Huyck, Jr. et al. | |
| 6,056,250 A | * | 5/2000 | Hillstrom et al. | 248/127 |
| 6,186,463 B1 | * | 2/2001 | Williams et al. | 248/413 |
| 6,217,005 B1 | * | 4/2001 | Scott | 254/100 |
| 6,237,268 B1 | * | 5/2001 | Levin | 248/160 |
| 6,315,251 B1 | * | 11/2001 | Stoudt et al. | 248/156 |
| 6,315,253 B1 | * | 11/2001 | Dicke et al. | 248/166 |
| 6,430,855 B1 | * | 8/2002 | Gertz et al. | 248/548 |

* cited by examiner

*Primary Examiner*—Ramon O. Ramirez
*Assistant Examiner*—A. Joseph Wujciak
(74) *Attorney, Agent, or Firm*—Fitch, Even, Tabin & Flannery

(57) ABSTRACT

A sign stand assembly having a message panel and a mast. A mast clamp is coupled to the lower end of the mast and a clevis is coupled to the mast clamp. A resilient support assembly includes a coil spring and a spring mounting adapter threadingly engaged with the upper end of the coil spring. A keyed portion including a mounting surface and a pair of key members upwardly protruding therefrom, comprising a concave socket for receiving the clevis with a close tolerance fit preventing rotation of the clevis.

7 Claims, 14 Drawing Sheets

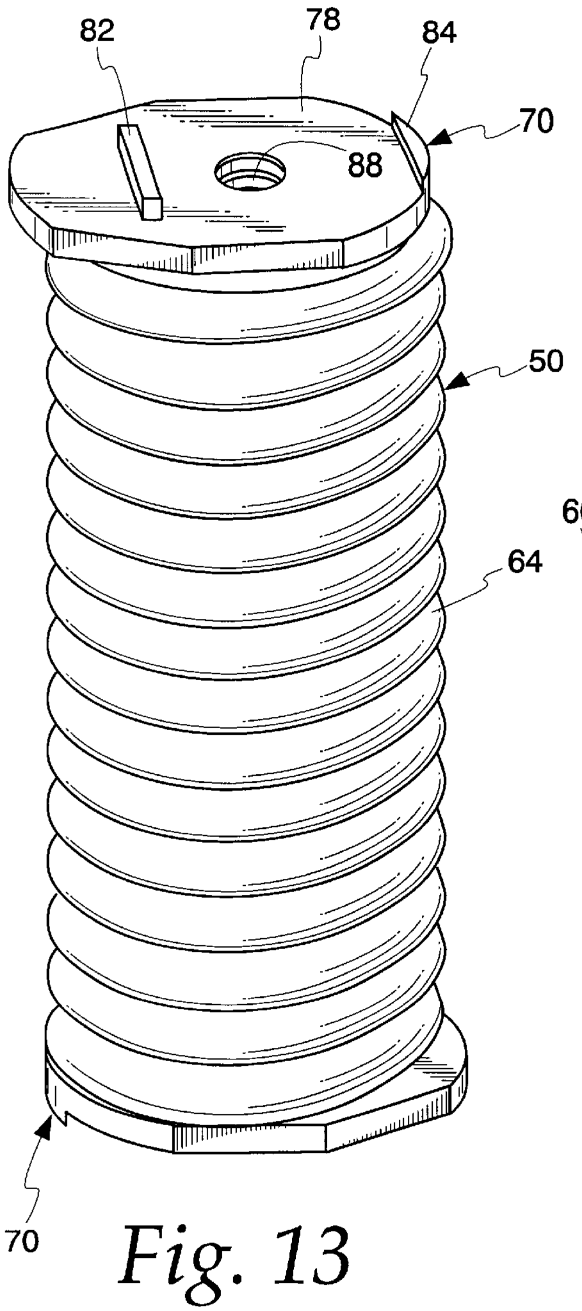
Fig. 13
Fig. 14
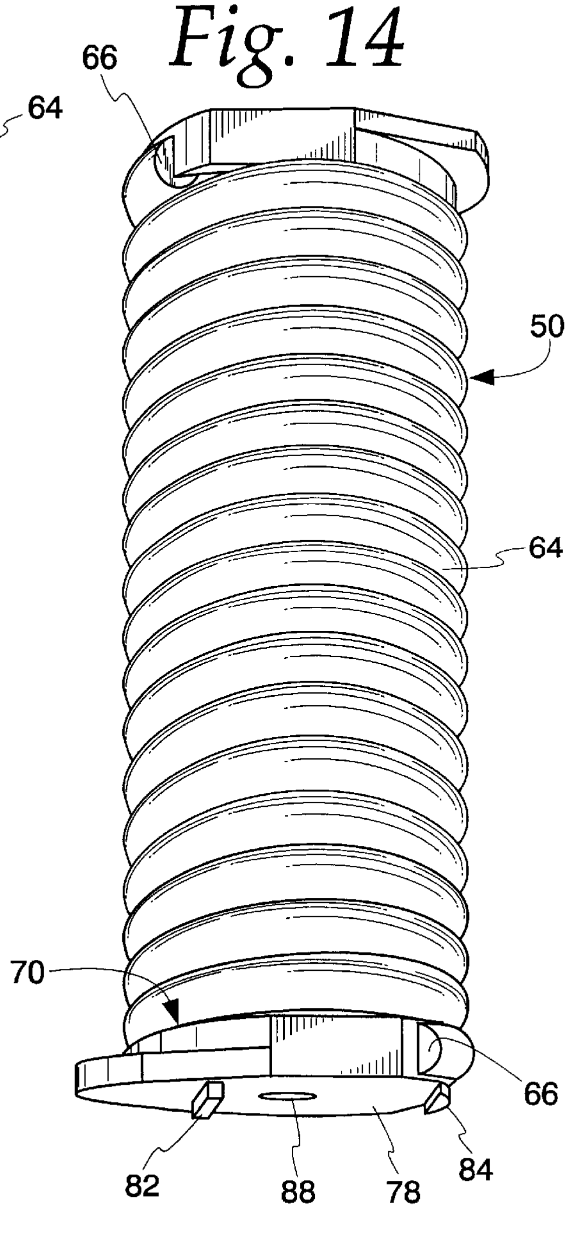

SIGN STAND FOR MOUNTING FLEXIBLE SIGN PANELS

BACKGROUND OF THE INVENTION

1. Field of the Invention

The present invention pertains to flexible sign panel assemblies.

2. Description of the Related Art

Roadside warning signs are required for temporary worksite activities such as utility repair and accident investigation. With increased traffic speeds and higher volumes of vehicle and pedestrian traffic temporary warning signs are employed in greater numbers. Accordingly, work crews carry larger numbers of lightweight temporary warning signs for ready deployment upon arrival at a worksite. It is important that the temporary warning signs of this type be lightweight and afford compact storage. Today, temporary warning signs typically employ message panels made of a flexible fabric such as a plastic mesh of polyethylene or vinyl material. The sign panels are typically reinforced by flexible ribs of lightweight material, such as glass fiber composition. In use, the flexible sign panels are stretched taut to maintain a generally flat message display position. Wind gusts and traffic induced wind bursts put substantial strain on the flexible panel and it is important that these applied forces be resolved by a sign panel support. It is important that the sign panel support be configurable for compact storage, to complement the compact storage of the sign panel.

SUMMARY OF THE INVENTION

It is an object of the present invention to provide a support base for a message panel, particularly message panels of the flexible type employed, for example, to provide roadside warnings.

Another object of the present invention is to provide a sign stand assembly with a support base which can be collapsed into a compact package for storage.

Yet another object of the present invention is to provide a support base having one or more upright coil springs adapted for flexural loading.

These and other objects according to principles of the present invention are provided in a resilient support assembly for use in assign stand assembly to support a mast which carries a message panel and which has a lower end extending below the message panel, the resilient support assembly comprising:

a coil spring;

an upper spring mounting adapter;

a lower spring mounting adapter;

the upper spring mounting adapter having external threads threadingly engaged with the upper end of the coil spring;

the upper spring mounting adapter including a lower threaded end carrying the external threads and an upper end having a keyed portion;

the keyed portion including a mounting surface and a pair of key members upwardly protruding therefrom, the key members located on either side of a threaded bore, with the key members and mounting surface together comprising a concave socket for support receiving a support for the mast with a close tolerance fit preventing rotation of the support with respect to the resilient support assembly and the threaded bore for maintaining the support in engagement with the mounting surface, in keyed engagement with the keyed portion of the spring mounting adapter;

the lower spring mounting adapter having external threads threadingly engaged with the lower end of the coil spring;

the lower spring mounting adapter including an upper threaded end carrying the external threads and a lower end having a mounting surface, the lower end defining a threaded bore and a pin receiving hole extending from the mounting surface;

a threaded fastener engaging the threaded bore to maintain the leg mount in engagement with the mounting surface; and a pin received in the pin-receiving hole for engaging apparatus supporting the resilient support assembly to prevent rotation relative thereto.

Other objects according to principles of the present invention are provided in a sign stand assembly comprising:

a message panel;

a panel support including a cross rib supporting the panel;

a mast connected to the cross rib and having a lower end extending below the message panel;

a support base including a clevis having a bight portion, a resilient support assembly and a leg mount, with the resilient support assembly connected to the leg mount;

a mast clamp coupled to the lower end of the mast to provide support therefor;

the clevis coupled to the lower end of the mast to provide support therefor;

ground-engaging members coupled to the leg mount to provide support therefor;

the resilient support assembly including a coil spring and a spring mounting adapter having external threads threadingly engaged with the upper end of the coil spring; and the spring mounting adapter including a lower threaded end carrying the external threads and an upper end having a keyed portion including a mounting surface and a pair of key members upwardly protruding therefrom, the key members located on either side of a threaded bore, with the key members and mounting surface together comprising a concave socket for receiving the bight portion with a close tolerance fit preventing rotation of the bight portion with respect to the resilient support assembly and a threaded fastener engaging the threaded bore to maintain the bight portion in engagement with the mounting surface, in keyed engagement with the keyed portion of the spring mounting adapter.

BRIEF DESCRIPTION OF THE DRAWINGS

FIGS. 13 and 14 are perspective views of the resilient support assembly;

DETAILED DESCRIPTION OF THE PREFERRED EMBODIMENTS

Figure 1:
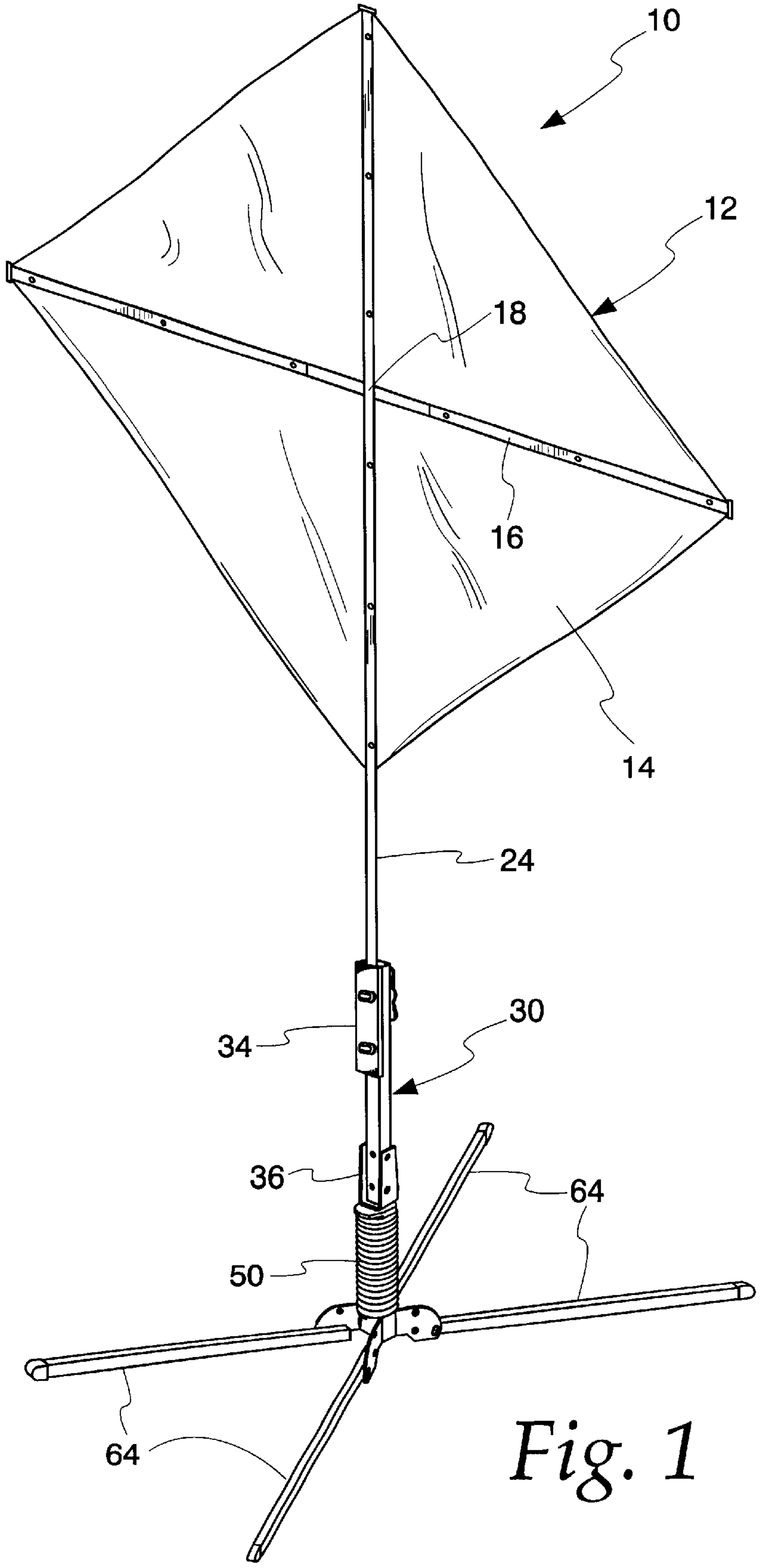
FIG. 1 is an elevational view of a sign stand assembly.

Turning now to FIGS. 1–15 and initially to FIG. 1 a first embodiment of a sign stand assembly is generally indicated at 10. Included is a message panel assembly generally indicated at 12 having a flexible message panel 14 made of any suitable material such as a plastic mesh of polyethylene or vinyl plastic. As will be seen herein, panel 14 is supported by a plurality of interconnected ribs. In the embodiment shown in FIG. 1, a conventional fiberglass cross member 16 is pinned at 18 to an upright fiberglass member or mast 24. The lower end of mast 24 is clamped in a mast coupler assembly 30 illustrated, in FIG. 2. Mast coupler assembly 30 is of conventional construction and includes a rigid metallic body 32 and a clamp member 34. Mast 24, which as mentioned, preferably comprises a fiberglass rib is inserted downwardly past clamp member 34 to the bottom of the mast coupler assembly. The lower end of the mast coupler assembly is secured to a clevis 36 using conventional bolt fasteners passing through apertures 38.

Figure 3:
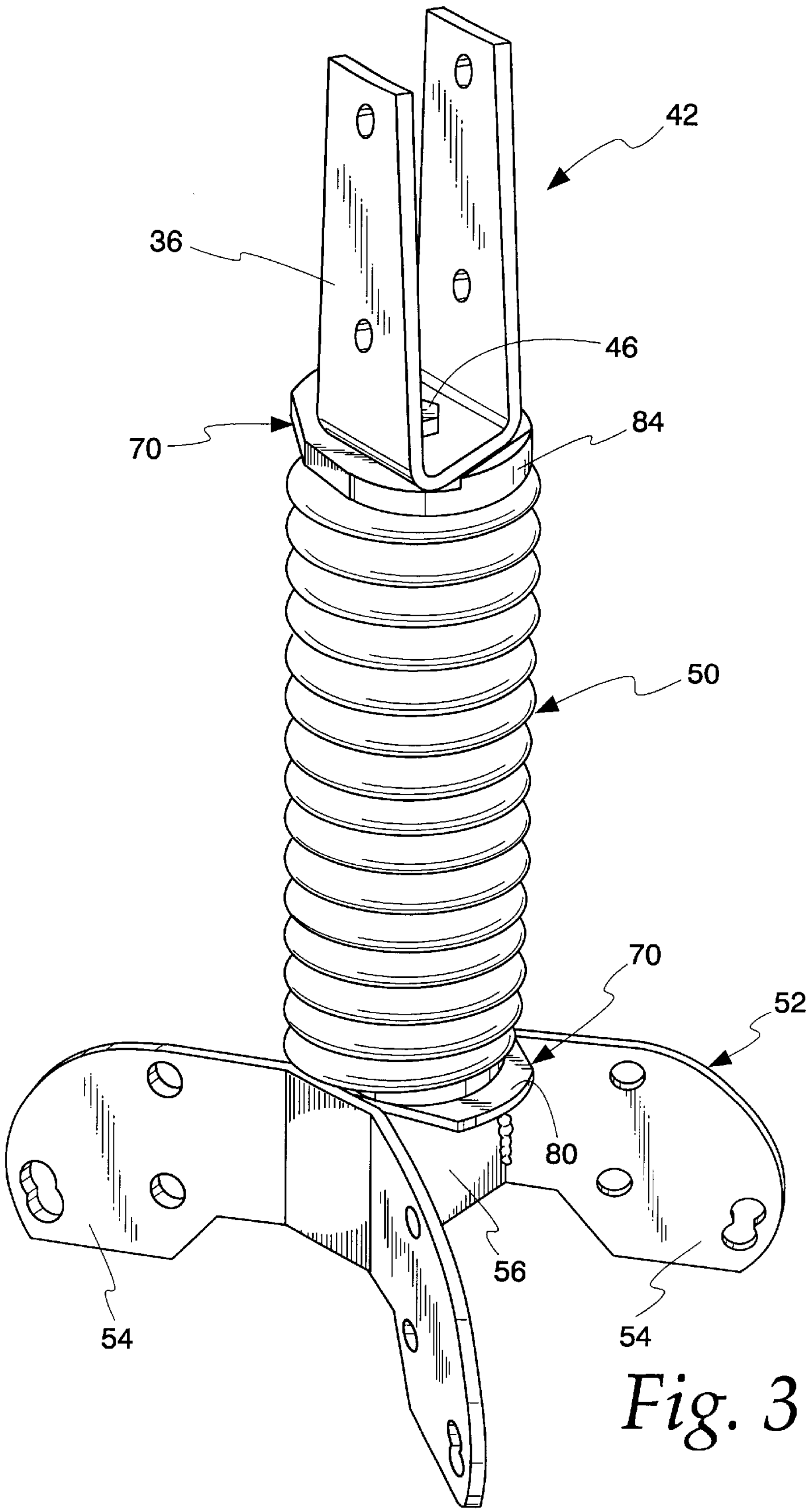
FIG. 3 is a perspective view of the support base thereof.
Figure 4:
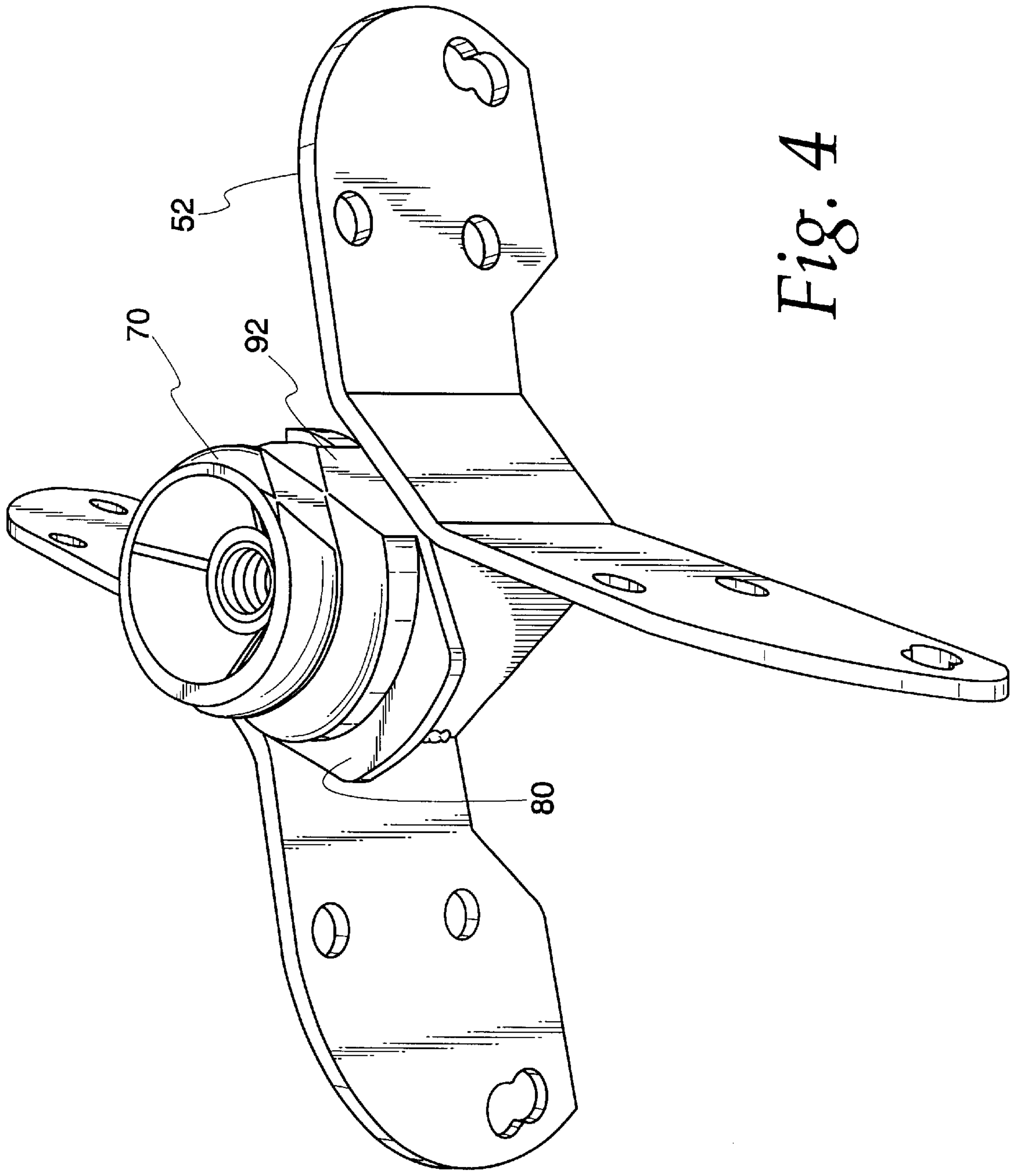
FIG. 4 is a perspective view of a leg mount assembly thereof.
Figure 15:
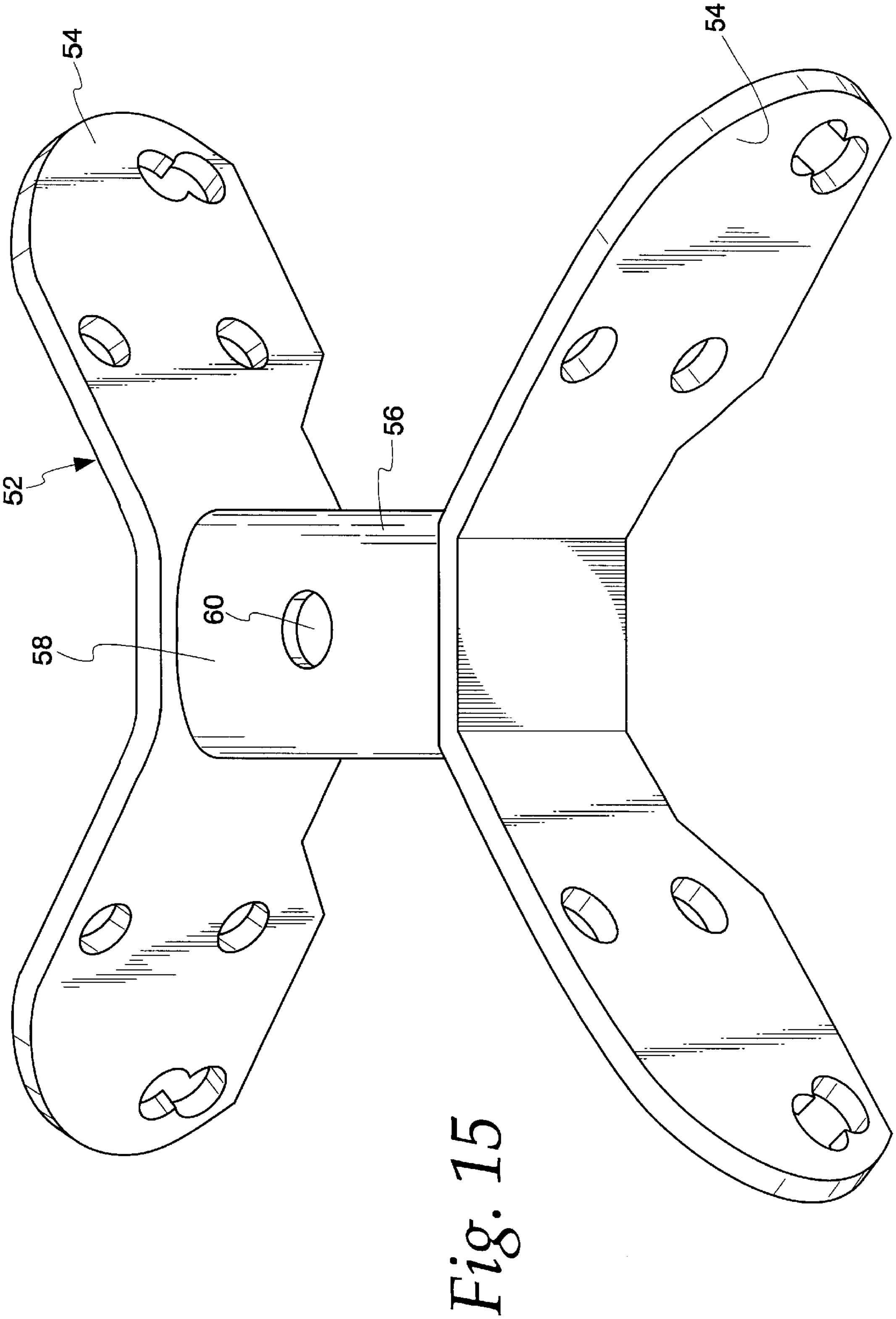
FIG. 15 is a perspective view of a leg mount.

Referring to FIG. 3, a bottom portion 42 of the sign stand assembly is illustrated. Included is the clevis 36 secured by a bolt fastener 46 to a resilient support assembly generally indicated at 50. The resilient support assembly is in turn mounted to a leg mount 52 which is illustrated in FIG. 15. Leg mount 52 includes a pair of side plates 54 joined to a saddle or center member 56. Center member 56 includes an upper surface 58 recessed below the top of the side plates 54. An aperture 60 is formed in center member 56 to receive a bolt fastener similar to bolt fastener 46. Side plates 54 provide mounting for legs 64 in a conventional manner (see FIGS. 1 and 18).

Referring to FIGS. 13 and 14, resilient support assembly 50 includes a coil spring 64. Spring 64 is of conventional helical wound wire design having cut ends 66 as can be seen for example in FIG. 14. Resilient support assembly 50 includes one or more spring mount adapters generally indicated at 70.

Figure 5:
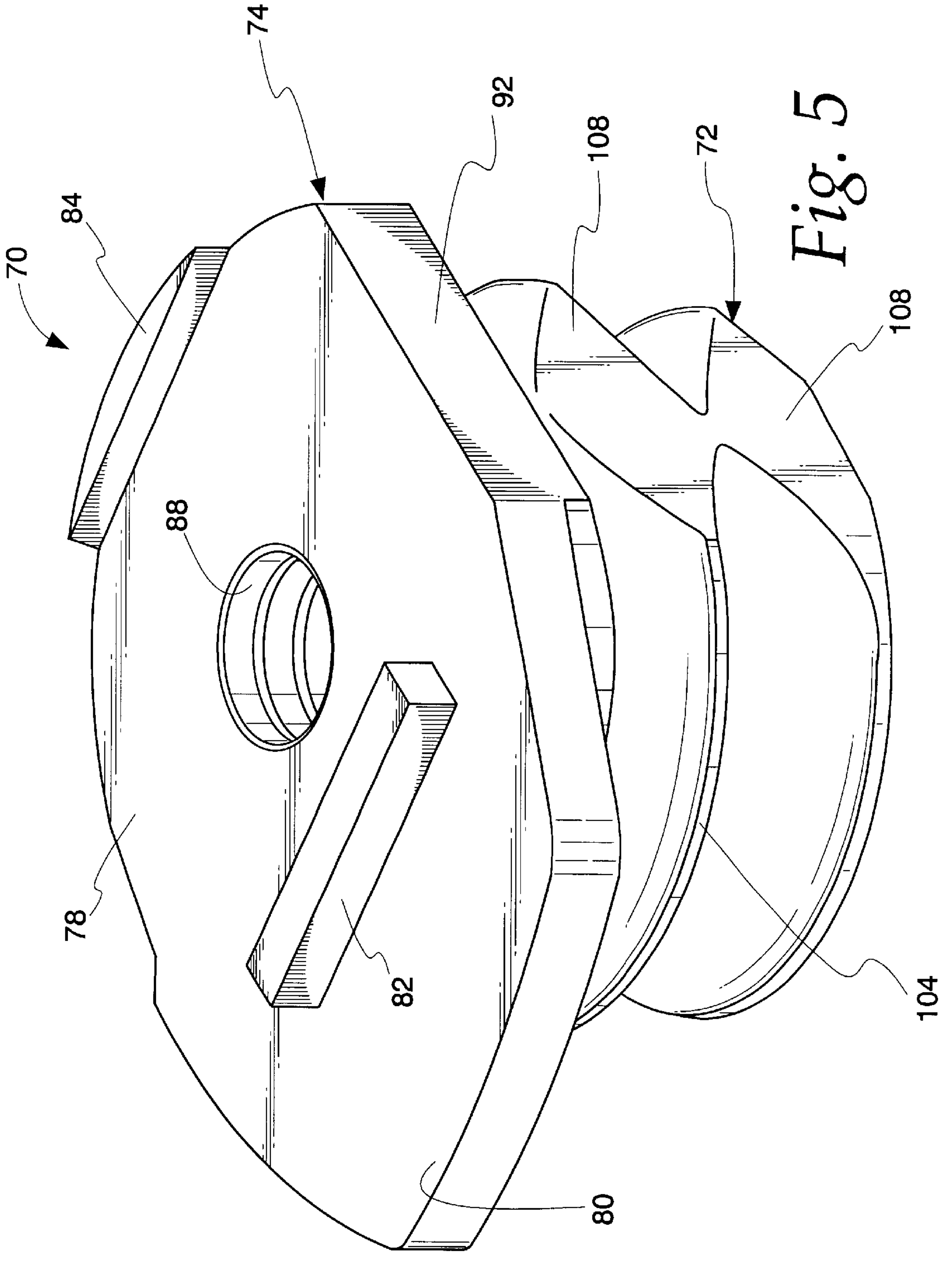
FIG. 5 is a perspective view of the spring mount adapter thereof.
Figure 6:
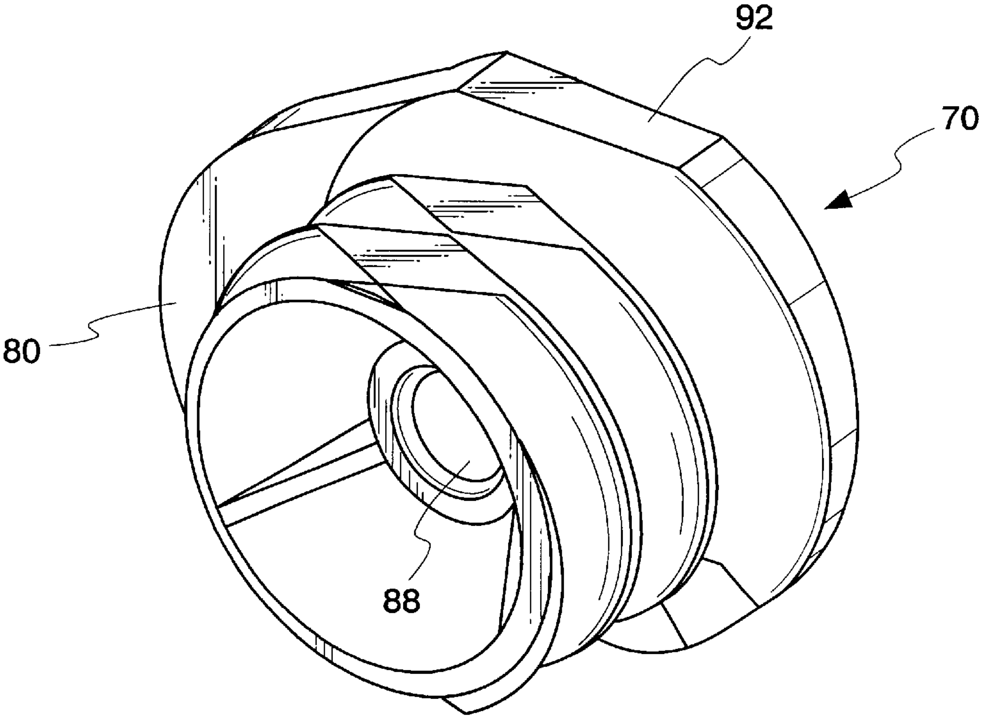
FIG. 6 is a another perspective view thereof.
Figure 7:
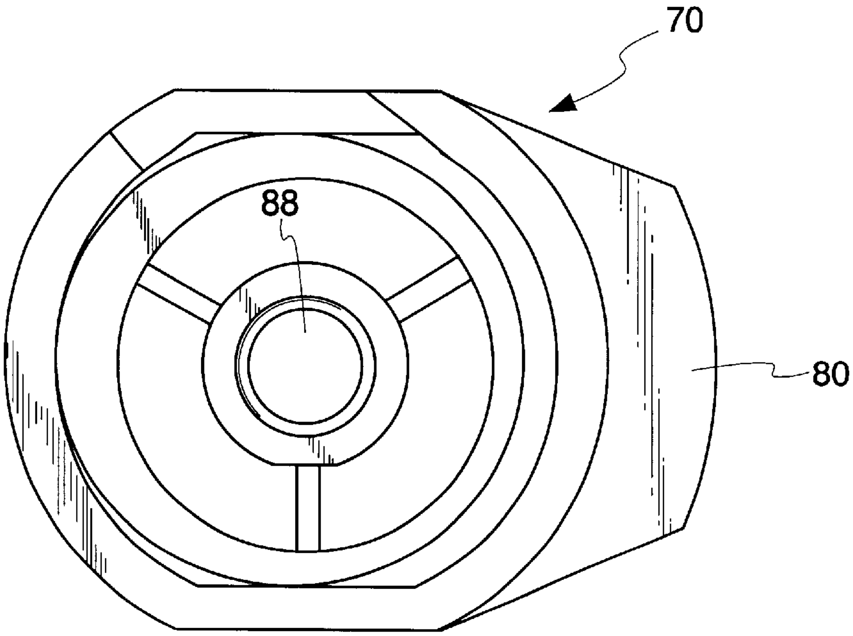
FIG. 7 is bottom plan view thereof.
Figure 8:
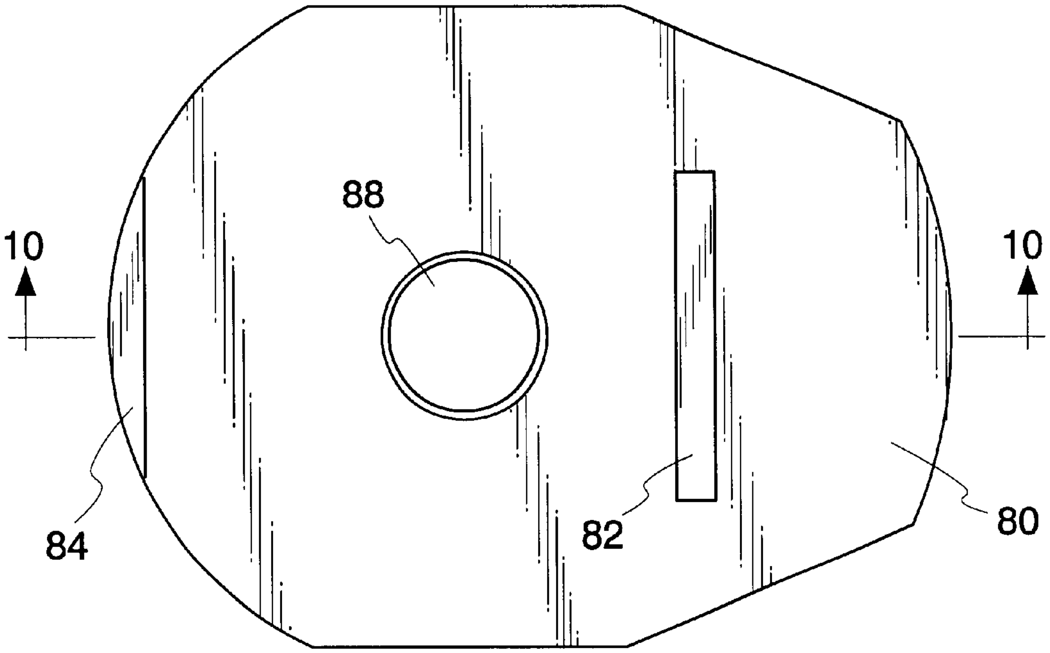
FIG. 8 is a top plan view thereof.
Figure 9:
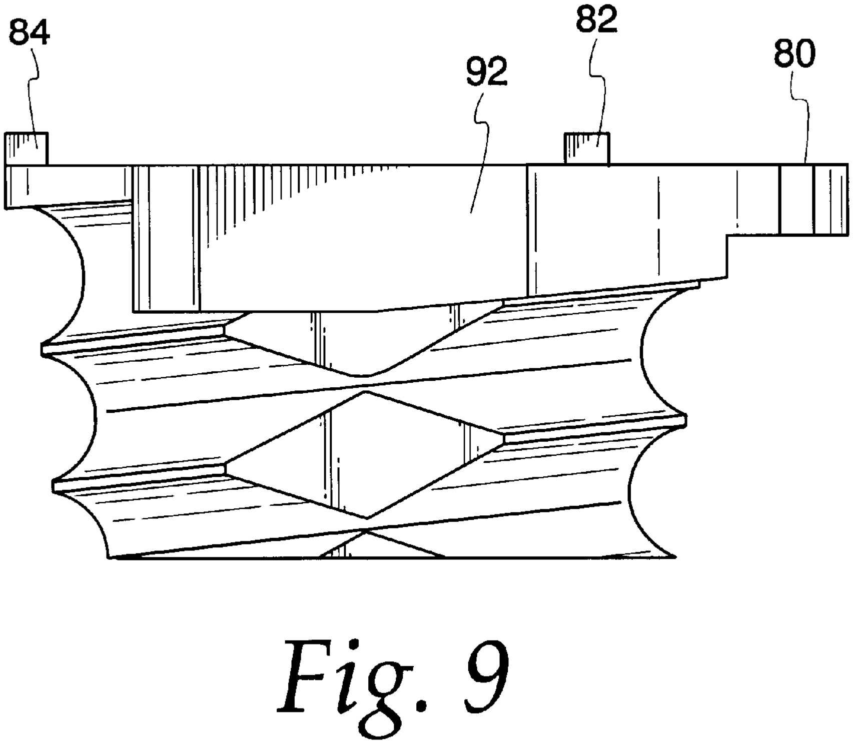
FIG. 9 is a side-elevational view thereof.

Referring to FIGS. 5–12 and initially to FIG. 5, spring mount adapter 70 includes a threaded body portion 72 and an enlarged end portion 74 including a keyed portion 78 and an extension portion 80. The keyed portion 78 includes upstanding key members or protrusions 82, 84. As illustrated in FIG. 5, protrusions 82, 84 are located on either side of a threaded bore 88 which receives the bolt fastener 46 mentioned above with reference to FIG. 3.

When the spring mounting adapter 70 is employed at the bottom of the resilient support assembly, as illustrated in FIGS. 13 and 14, a bolt fastener, similar to bolt fastener 46 is passed through aperture 60 in leg mount 52 to engage threaded bore 88, thereby securing the bottom of the resilient support assembly. The upper surface 58 of the leg mount of this first embodiment shown in FIGS. 1–15 engages the upper surface of end portion 74 located between keyed portions 82, 84. Generally flat sides 92 of the spring mounting adapter 70 (see FIG. 5) engage both portions of side plates 54 which protrude above surface 58 (see FIG. 15). Thus, with the flats 92 of the spring mounting adapter engaging side plates 54 and with the protrusions 82, 84 engaging opposed sides of center member 56 the spring mounting adapter 70 is securely interlocked or keyed with the leg mount 52. Surface 58 and the upper portions of the side plates 54 can be seen to cooperate to form a socket for receiving the spring mount adapter. Further, the surface 78 and protrusions 82, 84 can be seen to comprise a socket for receiving the saddle or middle portion 58 of the leg mount 52.

Referring again to FIGS. 3 and 5, the central portion of clevis 36 engages the keyed portion 78 with edges of the clevis being located immediately adjacent to or alternatively engaging, protrusions 82, 84 to provide a secured well-defined angular alignment between the clevis and the resilient support assembly, and in turn the leg mount 52 and supporting legs 64 (see FIG. 1). With the arrangement illustrated in FIG. 3, it is generally preferred that identical spring mounting adapters 70 be used at each end of the resilient support assembly.

Referring again to FIG. 2, the mast coupler assembly 30 includes a rectangular cross-section body portion 32 which provides rotationally-defined keyed interlocking with clevis 36. A defined rotational orientation is thereby provided between the mast coupler assembly and the leg mount and support legs. As will be seen, the relative angular or rotational positioning of the sign panel is defined with respect to the lower portion of the sign stand assembly.

Figure 2:
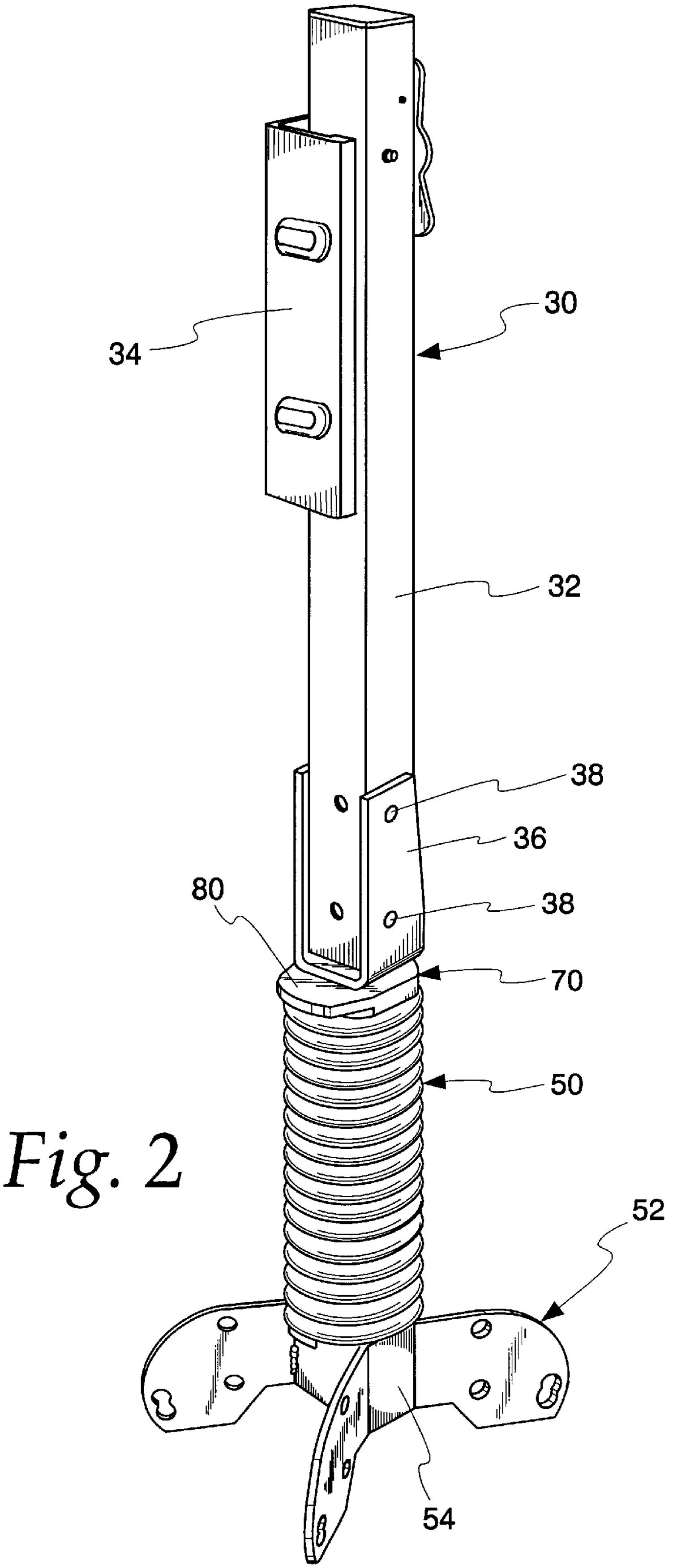
FIG. 2 is a fragmentary view of a lower portion of the sign stand assembly.

As mentioned, the upright mast 24 is preferably comprised of a fiberglass rib of conventional construction. Such ribs typically have a rectangular cross-sectional configuration. The sign stand support according to principles of the present invention provides further alignment features while protecting the lower end of mast 24. Mast 24 (see FIG. 1) is passed between clamp 34 and body 32 of the mast coupler assembly (see FIG. 2) and is lowered until contact is made with the upper surface of extension portion 80. This arrangement provides a ready visual cue for the assembly operation and if preferred desired alignment can be accomplished with a tactile indication by gently lower the mast 24 into engagement with extension portion 80. As can be seen in FIG. 5 and the other figures extension portion 80 is generally flat and with reference to FIG. 2 is readily aligned at a 90° angle to the longitudinal axis of the mast 24 which is clamped against body portion 32. The present invention thereby provides improved protection against splitting the bottom end of the fiberglass rib comprising mast 24. Assuming the bottom end of mast 24 is trimmed at a right angle to the mast longitudinal axis substantially all of the free end of the mast engages extension 80 at the moment of contact.

Figure 19:
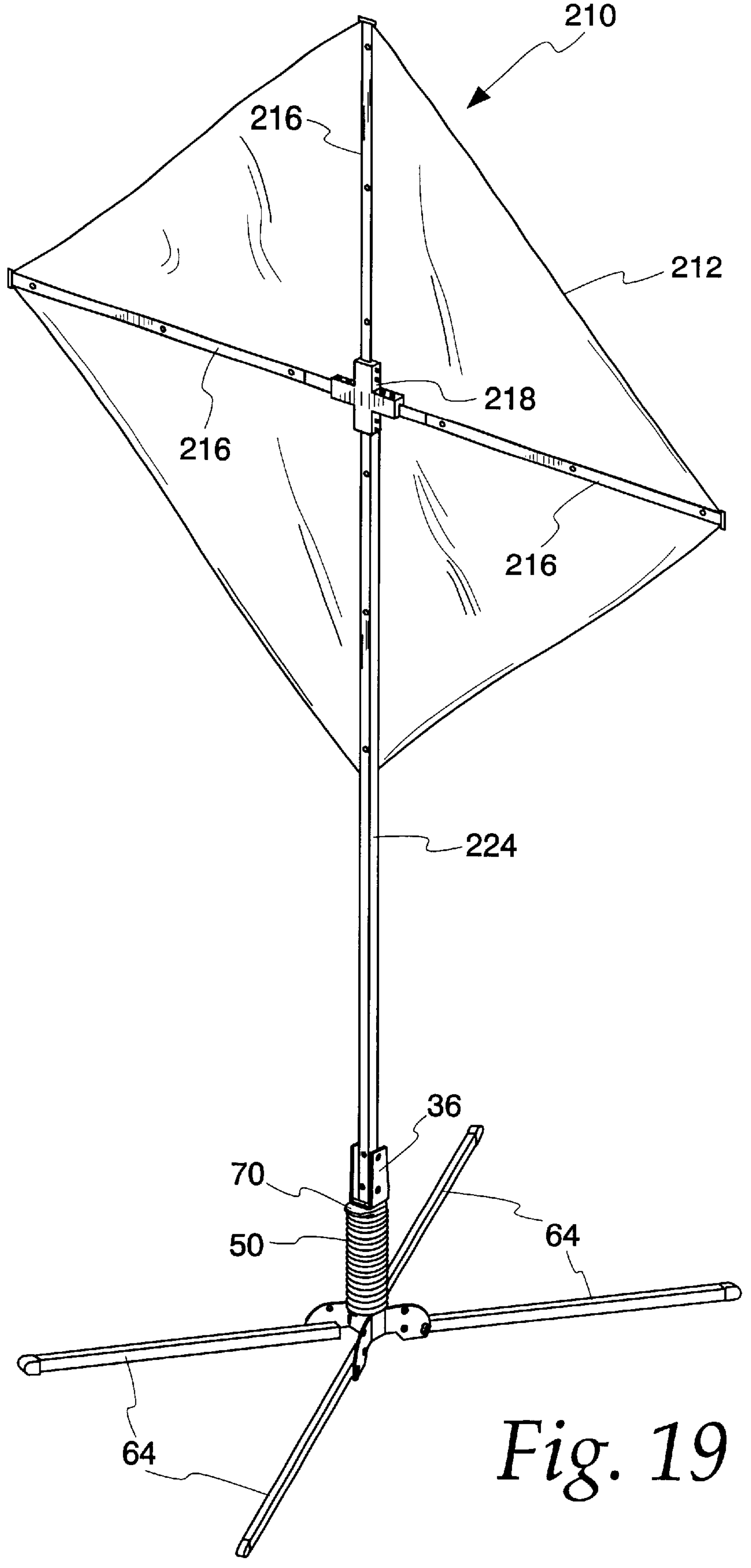
FIG. 19 is a perspective view of another embodiment of a sign stand assembly.

Referring to FIG. 19, mast 24 can be replaced by a metallic flat bar or more preferably, can comprise rigid, hollow metallic tubing 224 of the type employed for the base 32 of mast coupler assembly 30 (see FIG. 2). Engagement between the bottom of rigid metallic tubing 224 and the clevis are as described above with reference to FIG. 2. Preferably, the spring mounting adapter 70 with a socket defined by surface 58 and protrusions 82, 84 is employed to provide angular locking with the clevis, to provide a defined rotational or angular orientation between the mast (and hence the message panel) and the lower portion of the sign stand assembly. As shown in FIG. 19 a cross coupler 218 joins the upper end of mast 224 to panel supports 216.

Figure 10:
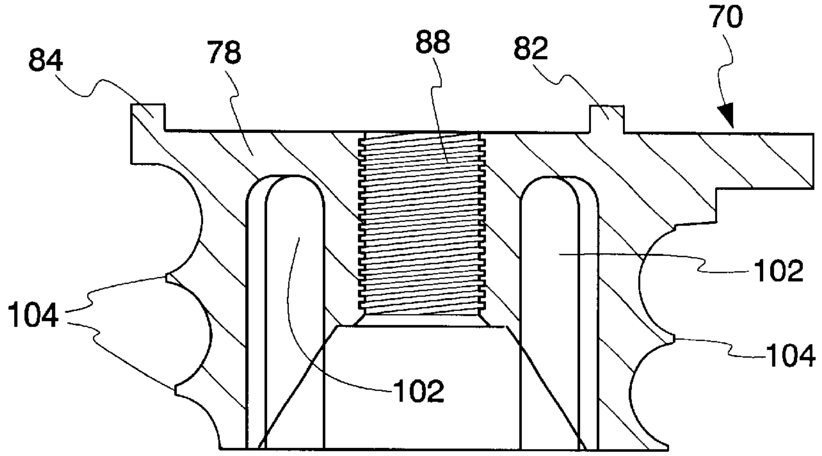
FIG. 10 is cross-sectional view taken along the line 10—10 of FIG. 8.

Referring now to FIGS. 5–12 and initially to FIG. 10, the spring mounting adapter preferably comprises a casting having a hollow bottom portion disposed beneath the solid keyed portion 78. Threaded portion 88 may be formed directly in the casting or may comprise an insert of steel or other material. Cavities 102 (see FIG. 10) extend from the bottom of the spring mounting adapter upwardly to surround the threaded portion, and to thin out or reduce the mass of the outer wall of the casting.

Figure 11:
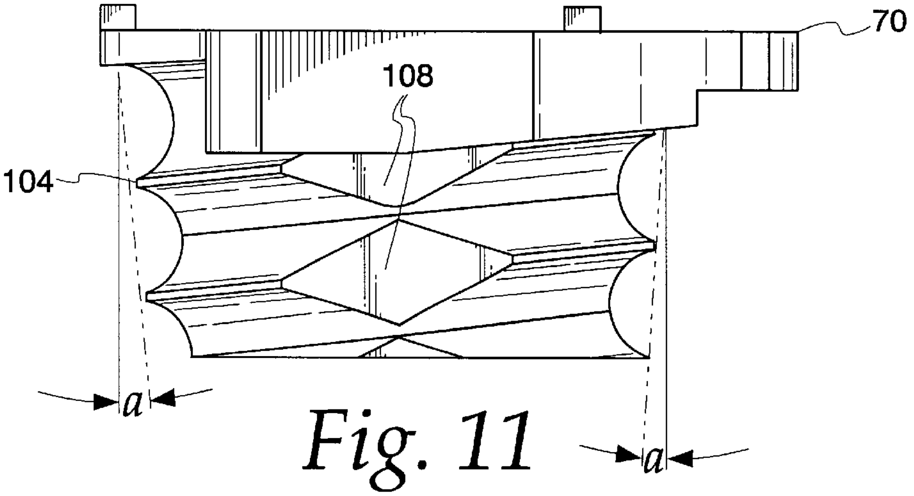
FIG. 11 is a side elevational view similar to that of FIG. 9 showing the tapered construction thereof.
Figure 12:
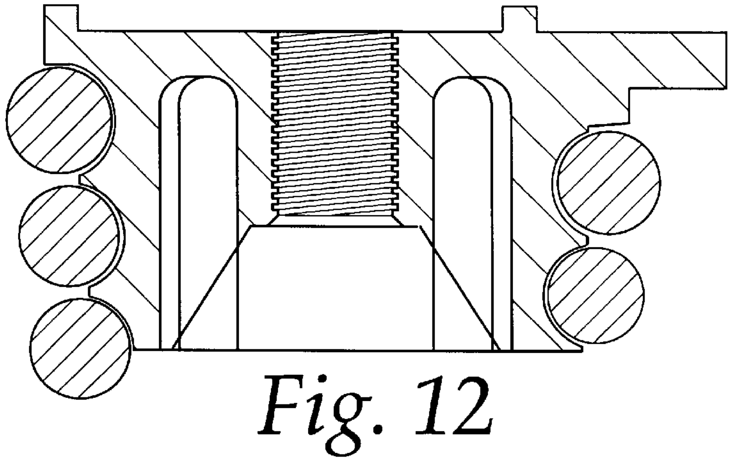
FIG. 12 is a cross-sectional view similar to that of FIG. 10, showing engagement with spring coils.

As can be seen in FIGS. 9–12, spring mounting adapter 70 includes an outer wall with a helical cavity defining threads 104. As can be seen in FIGS. 5 and 11, for example, the threads 104 are broken by flat surface portions 108. As indicated in FIG. 12, it is generally preferred that the coils of spring 64 are fully seated or at least substantially seated in the root depressions formed between teeth 104. With reference to FIG. 11, it is generally preferred that the threaded outer wall of the spring mounting adapter be tapered with an angle a ranging between 4 and 5°. The spring mounting adapters are screwed or threaded into the open ends of coil springs 64. Preferably, with reference to FIG. 12, the coils engaged with the spring mounting adapter are progressively opened or enlarged in diameter such that the resulting frictional engagement effectively prevents unintentional “back-out” of the spring mounting adapter.

Figure 16:
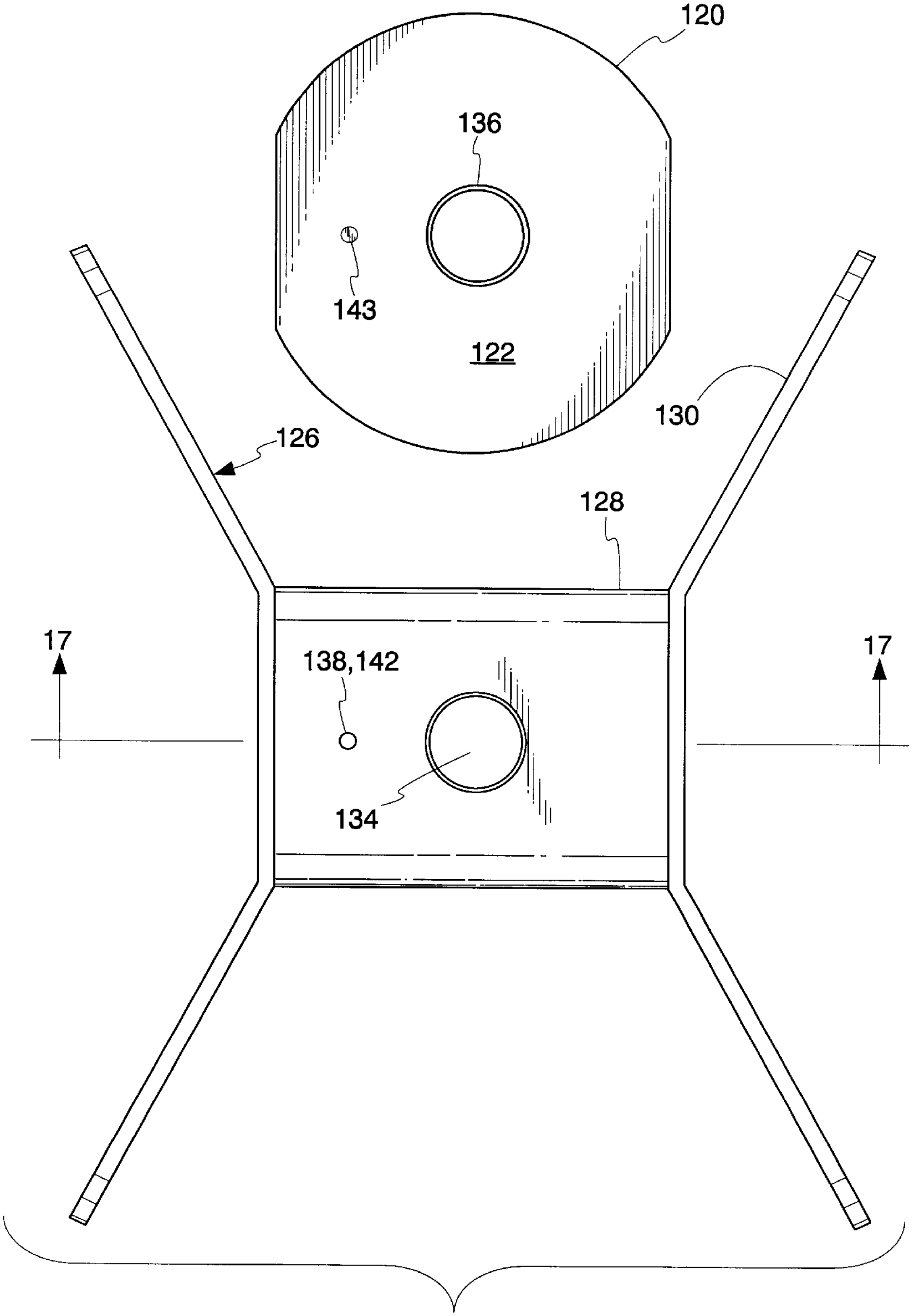
FIG. 16 is a top plan view of an alternative arrangement of support base components.
Figure 17:
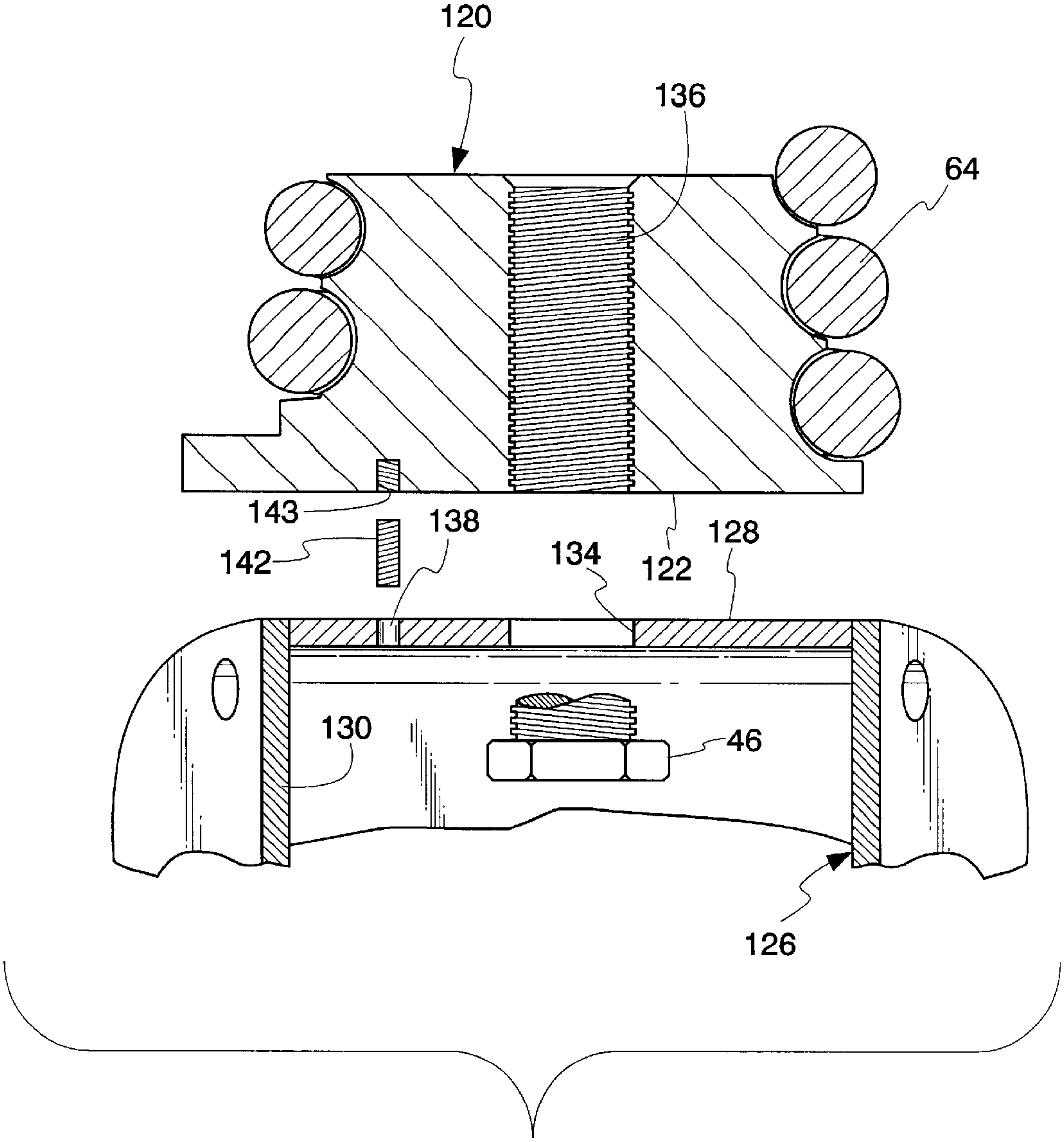
FIG. 17 is a cross-sectional view taken along the line 17—17 of FIG. 16.
Figure 18:
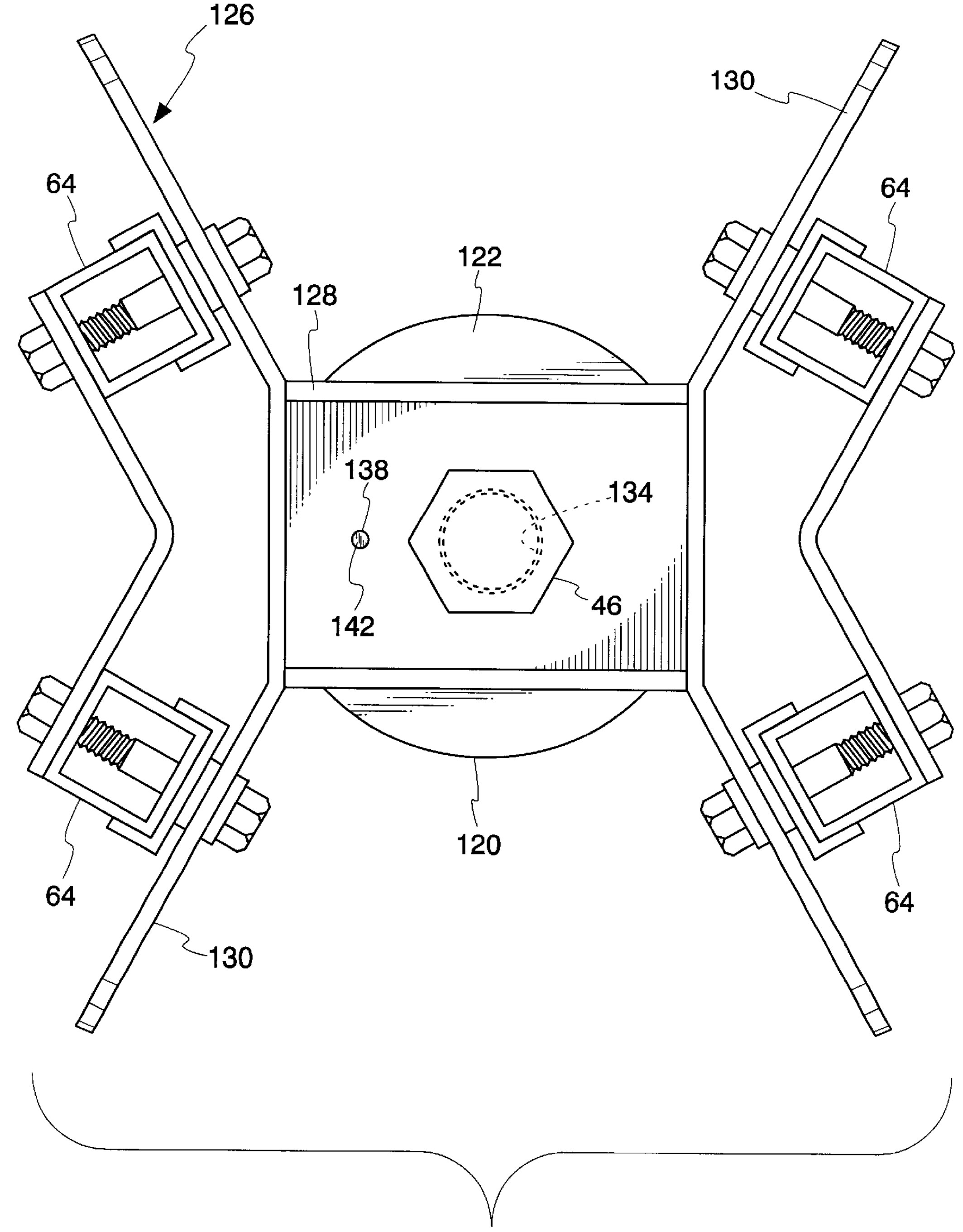
FIG. 18 is a fragmentary bottom plan view of an alternative sign stand assembly.

Turning now to FIGS. 16–18, in an alternative embodiment, the lower spring mounting adapter 70 is replaced by a spring mounting adapter 120 having a smooth surface 122. The leg mount 52 of the preceding embodiment is replaced with a leg mount 126 having a saddle or center portion 128 disposed at the top of side plates 130. Hence, the recess illustrated in FIG. 15 is lacking in the leg mount 126 which has a flush or generally planar upper surface (see FIG. 17). As with the preceding embodiment, a threaded fastener 46 is inserted through an aperture 134 so as to engage the internal threaded bore 136 of spring mounting adapter 120. When assembled, the smooth surface 122 is allowed free rotational movement about the upper surface of spring mounting adapter 126. This allows the ready angular or rotational positioning of the upper spring mounting adapter as desired. A hole 138 is formed in the spring mounting adapter 126 preferably at the time of manufacture. When the desired rotational alignment of the upper spring mounting adapter is attained, a reference mark is made in the surface 122 and a hole is drilled to allow fitting of a pin 142. Upon reassembly, the pin 142 is inserted in hole 138 to lock the members 120, 126 in desired rotational alignment. Other assembly options are possible. For example, a hole 143 formed in surface 122 of mounting adapter 120 is formed according to a reference mark relating to the predefined positioning of pin 142 received in hole 138 of the spring mounting adaptor. As a further option, pin 142 can be struck from the center portion 128 of the spring mounting adapter so as to protrude beyond its upper surface. The struck-out pin is then received in hole 143 formed in spring mounting adapter 120.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A sign stand assembly comprising:

a message panel;

a panel support including a cross rib supporting the panel;

a mast extending along a mast axis, connected to the cross rib and having a lower end extending below the message panel;

a support base including a clevis having a bight portion, a resilient support assembly and a leg mount, with the resilient support assembly connected to the leg mount;

the clevis coupled to the lower end of the mast to provide support therefor;

ground-engaging members coupled to the leg mount to provide support therefor;

the resilient support assembly including a coil spring with opposed upper and lower ends and an upper spring mounting adapter having external threads threadingly engaged with the upper end of the coil spring;

the upper spring mounting adapter including a lower threaded end carrying the external threads and an upper end including a mounting surface for engagement with the bight portion and a pair of key members upwardly protruding from the mounting surface the key members located on either side of a threaded bore, with the key members and mounting surface together comprising a concave socket for receiving the bight portion with a close tolerance fit preventing angular displacement between the bight portion and the upper spring mounting adapter and a threaded fastener engaging the threaded bore to maintain the bight portion in keyed engagement with the upper end of the spring mounting adapter;

the leg mount including a saddle carrying an upwardly extending pin;

the resilient support assembly further comprises a lower spring mounting adapter having external threads threadingly engaged with the lower end of the coil spring;

the lower spring mounting adapter including an upper threaded end carrying the external threads and a lower end having a mounting surface for engagement with the saddle, the lower end defining a lower threaded bore and a pin receiving hole extending from the mounting surface;

a lower threaded fastener engaging the lower threaded bore to maintain the pin in engagement with the lower spring mounting adapter; and the pin preventing angular displacement between the saddle and the lower spring mounting adapter and cooperating with the upper and the lower spring mounting adapters, the spring, the clevis and the saddle to maintain an overall alignment of the whole sign stand assembly along a common axis extending generally parallel to said mast axis.

2. The sign stand assembly of claim 1 wherein the lower end of the mast is directly connected to the clevis by threaded fasteners.

3. The sign stand assembly of claim 1 further comprising a mast clamp coupled to the lower end of the mast to provide support therefor, with the clevis connected to the mast clamp.

4. The sign stand assembly of claim 3 wherein said mast comprises a fiberglass rib.

5. The sign stand assembly of claim 1 wherein the upper end of the spring mounting adapter further includes an extension portion to one side of said keyed portion, said extension portion providing thrust support for the bottom of the mast.

6. The sign stand assembly of claim 5 wherein the said mast comprises a fiberglass rib.

7. A sign stand for use with a message panel assembly including a message panel, a panel support with a cross rib supporting the panel, and a mast extending along a mast axis, connected to the cross rib and having a lower end extending below the message panel, the sign stand comprising:

a support base including a clevis having a bight portion, a resilient support assembly and a leg mount, with the resilient support assembly connected to the leg mount;

the clevis for coupling to the lower end of the mast to provide support therefor;

ground-engaging members coupled to the leg mount to provide support therefor;

the resilient support assembly including a coil spring with opposed upper and lower ends and an upper spring mounting adapter having external threads threadingly engaged with the upper end of the coil spring; and the upper spring mounting adapter including a lower threaded end carrying the external threads and an upper end including a mounting surface for engagement with the bight portion and a pair of key members upwardly protruding from the mounting surface, the key members located on either side of a threaded bore, with the key members and mounting surface together comprising a concave socket for receiving the bight portion with a close tolerance fit preventing angular displacement between the bight portion and the upper spring mounting adapter and a threaded fastener engaging the threaded bore to maintain the bight portion in keyed engagement with the upper end of the spring mounting adapter;

the leg mount including a saddle carrying an upwardly extending pin;

the resilient support assembly further comprises a lower spring mounting adapter having external threads threadingly engaged with the lower end of the coil spring;

the lower spring mounting adapter including an upper threaded end carrying the external threads and a lower end having a mounting surface for engagement with the saddle, the lower end defining a lower threaded bore and a pin receiving hole extending from the mounting surface;

a lower threaded fastener engaging the lower threaded bore to maintain the saddle in engagement with the mounting surface of the lower spring mounting adapter;

the pin received in the pin-receiving hole of the lower spring mounting adapter to prevent angular displacement between the saddle and the lower spring mounting adapter and cooperating with the upper and the lower spring mounting adapters, the spring, the clevis and the saddle to maintain an overall alignment of the sign stand and the message panel assembly along a common axis extending generally parallel to said mast axis.

* * * * *